(12) United States Patent
Edwards

(10) Patent No.: US 11,783,252 B1
(45) Date of Patent: Oct. 10, 2023

(54) APPARATUS FOR GENERATING RESOURCE ALLOCATION RECOMMENDATIONS

(71) Applicant: Double Diamond Interests, LLC, Houston, TX (US)

(72) Inventor: Lance Edwards, Houston, TX (US)

(73) Assignee: Double Diamond Interests, LLC, Houston, TX (US)

( * ) Notice: Subject to any disclaimer, the term of this patent is extended or adjusted under 35 U.S.C. 154(b) by 0 days.

(21) Appl. No.: 17/977,150

(22) Filed: Oct. 31, 2022

(51) Int. Cl.
*G06Q 10/00* (2023.01)
*G06Q 10/0631* (2023.01)
*G06F 40/284* (2020.01)
*G06F 40/40* (2020.01)

(52) U.S. Cl.
CPC ..... *G06Q 10/06315* (2013.01); *G06F 40/284* (2020.01); *G06F 40/40* (2020.01)

(58) Field of Classification Search
None
See application file for complete search history.

(56) References Cited

U.S. PATENT DOCUMENTS

| | | | | |
|---|---|---|---|---|
| 2009/0254399 | A1* | 10/2009 | Cristol | G06Q 30/02 |
| | | | | 705/7.36 |
| 2016/0162478 | A1* | 6/2016 | Blassin | G06Q 10/063112 |
| | | | | 706/12 |
| 2018/0365624 | A1* | 12/2018 | Pati | G06Q 10/063116 |
| 2019/0258631 | A1* | 8/2019 | Pal | G06F 16/24535 |
| 2019/0355063 | A1* | 11/2019 | Probetts | G06Q 40/06 |
| 2020/0143304 | A1* | 5/2020 | Schwartz | G06F 3/04847 |
| 2020/0311819 | A1* | 10/2020 | Blank | G06Q 40/06 |
| 2020/0349648 | A1* | 11/2020 | Cosmano | G06F 16/9024 |
| 2022/0122182 | A1* | 4/2022 | Marshall | G06Q 40/06 |

OTHER PUBLICATIONS

Jangmin, O., et al. "Adaptive stock trading with dynamic asset allocation using reinforcement learning." Information Sciences 176. 15 (2006): 2121-2147. (Year: 2006).*
Ko, Po-Chang, and Ping-Chen Lin. "Resource allocation neural network in portfolio selection." Expert Systems with Applications 35.1-2 (2008): 330-337. (Year: 2008).*
Abraham, Facundo, Sergio L. Schmukler, and Jose Tessada. "Robo-advisors: Investing through machines." World Bank Research and Policy Briefs 134881 (2019). (Year: 2019).*
Alsabah, Humoud, et al. "Robo-advising: Learning investors' risk preferences via portfolio choices." Journal of Financial Econometrics 19.2 (2021): 369-392. (Year: 2021).*

* cited by examiner

*Primary Examiner* — Gurkanwaljit Singh
(74) *Attorney, Agent, or Firm* — CALDWELL INTELLECTUAL PROPERTY LAW

(57) ABSTRACT

In an aspect, an apparatus for generating resource allocation recommendations is presented. An apparatus includes at least a processor. An apparatus includes a memory communicatively connected to at least a processor configuring the at least a processor to receive resource allocation data. At least a processor is configured to compare resource allocation data to an allocation improvement metric. At least a processor is configured to determine, as a function of a comparison, resource feedback. At least a processor is configured to provide a resource allocation recommendation to a user as a function of resource feedback.

20 Claims, 9 Drawing Sheets

APPARATUS FOR GENERATING RESOURCE ALLOCATION RECOMMENDATIONS

FIELD OF THE INVENTION

The present invention generally relates to the field of resources. In particular, the present invention is directed to an apparatus for generating resource allocation recommendations.

BACKGROUND

There are many ways in which one might want to allocate their resources. However, individuals may not be able to accurately and safely do so. As such, modern apparatuses for generating resource feedback can be improved.

SUMMARY OF THE DISCLOSURE

In an aspect, an apparatus for generating resource allocation recommendations is presented. An apparatus includes at least a processor. An apparatus includes a memory communicatively connected to at least a processor configuring the at least a processor to receive resource allocation data. At least a processor is configured to compare resource allocation data to an allocation improvement metric. At least a processor is configured to determine, as a function of a comparison, resource feedback. At least a processor is configured to provide a resource allocation recommendation to a user as a function of resource feedback.

In another aspect, a method of providing resource allocation recommendations is provided. A method includes receive, via at least a processor, resource data. A method includes comparing, via at least a processor, resource allocation data to an allocation improvement metric. A method includes determining, via at least a processor, and as a function of a comparison, resource feedback. A method includes providing a resource allocation recommendation to a user as a function of resource feedback.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for resource feedback. In an embodiment, an apparatus for resource allocation recommendations is presented.

Aspects of the present disclosure can be used to generate resource feedback recommendations. Aspects of the present disclosure can also be used to determine potential risks of allocation of one or more resources. This is so, at least in part, because apparatuses presented may use machine learning models.

Aspects of the present disclosure allow for providing intuitive graphical user interface improvements for presenting resource feedback. Exemplary embodiments illustrating aspects of the present disclosure are described below in the context of several specific examples.

Figure 1:
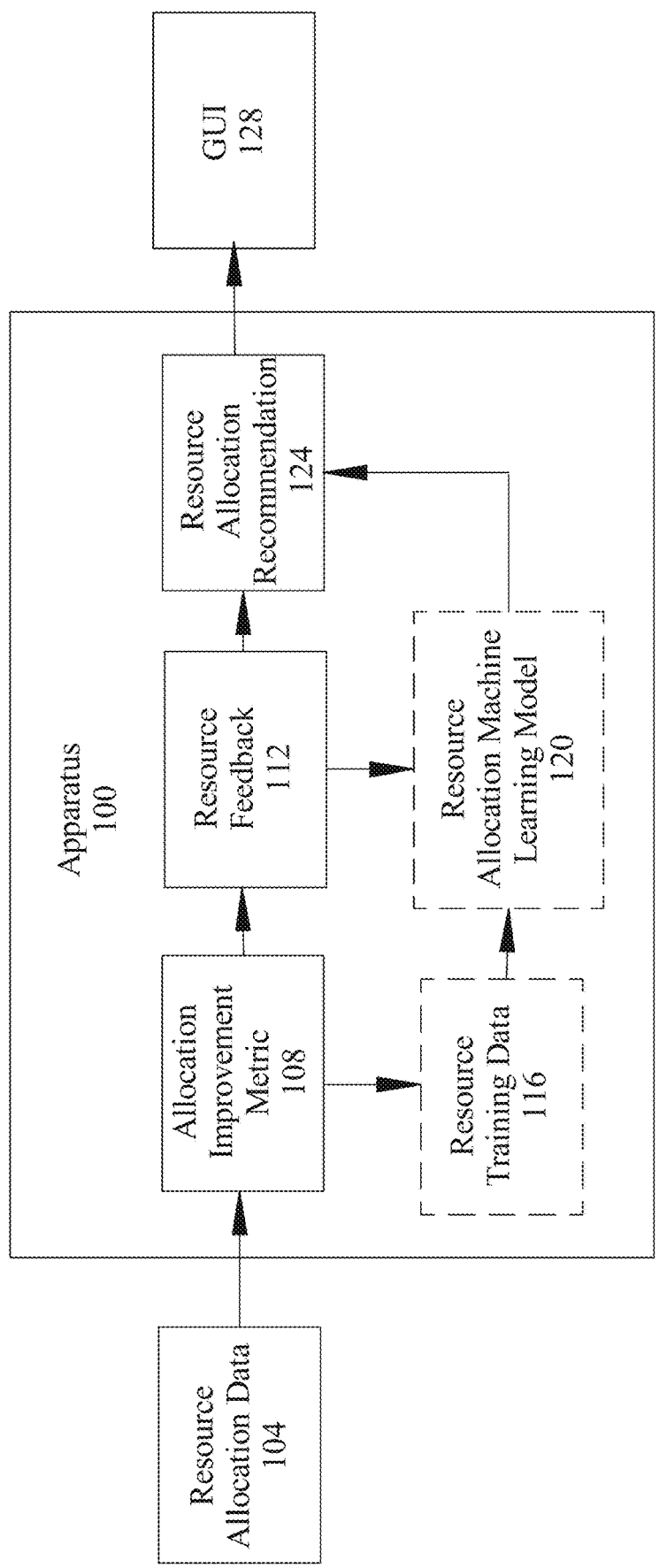
FIG. 1 is a block diagram of an exemplary embodiment of an apparatus for generating resource allocation recommendations.

Referring now to FIG. 1, an exemplary embodiment of an apparatus 100 is illustrated. Apparatus 100 may include at least a processor and a memory communicatively connected to the at least a processor. A memory may contain instructions configuring at least a processor to perform various tasks. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a computing device. Apparatus 100 may include any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, apparatus 100 may be configured to receive resource allocation data 104. "Resource allocation data" as used in this disclosure is information pertaining to one or more assets of an individual. Assets may include, but are not limited to, financial accounts, real estate holdings, vehicle holdings, and the like. In some embodiments, resource allocation data 104 may include property data. "Property data" as used in this disclosure is information pertaining to one or more real estate holdings of an individual. Property data may include, but is not limited to, geographical location, square footage, quantity of floors, quantity of bedrooms, quantity of bathrooms, material of floor, material of wall, proximity to town centers, and the like. Property data may include, without limitation, rent data, average occupancy, expense ratios, median household incomes, median home values, crime statistics, job growth data, interest rate data, financial aid qualification data, loan-to-value (LTV) data, and the like. In some embodiments, resource allocation data 104 may include historical investment data. "Historical investment data" as used in this disclosure is information pertaining to previous values of one or more assets. Historical investment data my include, but is not limited to, one or more trends, averages in prices, predicted trends, and the like. In some embodiments, apparatus 100 may determine historical investment data from resource allocation data 104, such as through a machine learning model, such as any machine learning model as described throughout this disclosure, without limitation. In some embodiments, resource allocation data 104 may include user finance data. "User finance data" as used in this disclosure is information relating to an individual's economic standing. User finance data may include, but is not limited to, liquidity amounts, net worth, real estate worth, projected income, historic income, tax information, and the like. Apparatus 100 may utilize user finance data, historical investment data, and/or other data of resource allocation data 104 to generate resource feedback 112, as described below.

Still referring to FIG. 1, in some embodiments, apparatus 100 may receive resource allocation data 104 through user input, external computing devices, and/or through extraction of one or more resource documents. A "resource document" as used in this disclosure is any data structure pertaining to one or more assets. Resource documents may include, but are not limited to, real estate maps, financial accounts, word documents, spreadsheets, photos, and the like. In some embodiments, apparatus 100 may communicate with one or more external databases, computing devices, and the like, such as without limitation, third-party databases. Third-party databases may include one or more brokerage databases, apartment complex databases, real estate databases, and the like. Apparatus 100 may be configured to search through one or more third-party databases, such as through a web crawler function, without limitation. In some embodiments, apparatus 100 may extract one or more words, phrases, and the like of one or more resource documents through a language processing module. A language processing module may include any hardware and/or software module. A language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, a language processing module may operate to produce a language processing model. A language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, a language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating a language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, a language processing module may use a corpus of documents to generate associations between language elements in a language processing module, and diagnostic engine may then use such associations to analyze words extracted from one or more documents and determine that the one or more documents indicate significance of a category. In an embodiment, language module and/or apparatus 100 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into apparatus 100. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

Still referring to FIG. 1, in some embodiments, apparatus 100 may be configured to perform optical character recognition. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, Calif., United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, such as any neural network as described throughout this disclosure, without limitation.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, in some embodiments, apparatus 100 may be configured to generate a query for resource data, resource allocation data, and the like. A "query" as used in this disclosure is a search function that returns data. Apparatus 100 may generate a query as a function of resource allocation data 104. A query may include querying criteria. "Querying criteria" as used in this disclosure are parameters that constrain a search. Querying criteria may include a similarity of semantic elements of databases to plurality semantic elements of resource allocation data 104. A similarity may be determined by a clustering algorithm, optimization model, and the like. An "optimization model" as used in this disclosure is an algorithm seeking to maximize or minimize a parameter. Querying criteria may be tuned by a machine learning model, such as any machine learning model as described throughout this disclosure, without limitation.

Still referring to FIG. 1, generating a query may include generating a web crawler function. A query may be configured to search for one or more keywords, key phrases, and the like. A keyword may be used by a query to filter potential results from a query. As a non-limiting example, a keyword may include "Condo". A query may be configured to generate one or more key words and/or phrases as a function of resource allocation data 104. A query may give a weight to one or more semantic elements of resource allocation data 104. "Weights", as used herein, may be multipliers or other scalar numbers reflecting a relative importance of a particular attribute or value. A weight may include, but is not limited to, a numerical value corresponding to an importance of an element. In some embodiments, a weighted value may be referred to in terms of a whole number, such as 1, 100, and the like. As a non-limiting example, a weighted value of 0.2 may indicate that the weighted value makes up 20% of the total value. As a non-limiting example, resource allocation data 104 may include the words "two bedrooms". A query may give a weight of 0.8 to the word "two", and a weight of 0.2 to the word "bedrooms". A query may map a plurality of semantic elements of query results having similar elements to the word "two" with differing elements than the word "bedrooms" due to the lower weight value paired to the word "two". In some embodiments, a query may pair one or more weighted values to one or more semantic elements of resource allocation data 104. Weighted values may be tuned through a machine-learning model, such as any machine learning model as described throughout this disclosure without limitation. In some embodiments, a query may generate weighted values based on prior queries. In some embodiments, a query may be configured to filter out one or more "stop words" that may not convey meaning, such as "of," "a," "an," "the," or the like.

Still referring to FIG. 1, in some embodiments, a query may include an index classifier. In an embodiment, an index classifier may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. An index classifier may include a classifier configured to input semantic elements and output web search indices. A "web search index," as defined in this disclosure is a data structure that stores uniform resource locators (URLs) of web pages together with one or more associated data that may be used to retrieve URLs by querying the web search index; associated data may include keywords identified in pages associated with URLs by programs such as web crawlers and/or "spiders." A web search index may include any data structure for ordered storage and retrieval of data, which may be implemented as a hardware or software module. A web search index may be implemented, without limitation, as a relational database, a key-value retrieval datastore such as a NOSQL database, or any other format or structure for use as a datastore that a person skilled in the art would recognize as suitable upon review of the entirety of this disclosure. Data entries in a web search index may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a web search index may reflect categories, cohorts, and/or populations of data consistently with this disclosure. In an embodiment, a web search query at a search engine may be submitted as a query to a web search index, which may retrieve a list of URLs responsive to the query. In some embodiments, apparatus 100 may be configured to generate a query based on a freshness and/or age of a query result. A freshness may include an accuracy of a query result. An age may include a metric of how outdated a query result may be. In some embodiments, apparatus 100 may generate a web crawler configured to search the Internet for resource data, such as, but not limited to, real estate data, investment data, market values of assets, and the like. As a non-limiting example, a query may include a web crawler configured to search and/or index information of words and/or phrases of resource data having a similarity to resource allocation data 104.

Still referring to FIG. 1, apparatus 100 and/or another device may generate an index classifier using a classification algorithm, defined as a process whereby a computing device derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data may include data containing correlations that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 1, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below. Training data used by a computing device may correlate any input data as described in this disclosure to any output data as described in this disclosure. In some embodiments, training data may include index training data. Index training data, defined as training data used to generate an index classifier, may include, without limitation, a plurality of data entries, each data entry including one or more elements of semantic data such as characters, symbols, phrases, text strings, and one or more correlated similar semantic elements of an opportunity, where similar semantic elements of an opportunity and associated semantic data may be identified using feature learning algorithms as described below. Index training data and/or elements thereof may be added to, as a non-limiting example, by classification of multiple users' semantic data to similar semantic data of opportunities using one or more classification algorithms.

Still referring to FIG. 1, apparatus 100 may be configured to generate an index classifier using a Naïve Bayes classification algorithm. A Naïve Bayes classification algorithm generates classifiers by assigning class labels to problem instances, represented as vectors of element values. Class labels may be drawn from a finite set. A Naïve Bayes classification algorithm may include generating a family of algorithms that assume that the value of a particular element is independent of the value of any other element, given a class variable. A Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A Naïve Bayes algorithm may be generated by first transforming training data into a frequency table. Apparatus 100 may then calculate a likelihood table by calculating probabilities of different data entries and classification labels. Apparatus 100 may utilize a Naïve Bayes equation to calculate a posterior probability for each class. A class containing the highest posterior probability may be the outcome of prediction. A Naïve Bayes classification algorithm may include a gaussian model that follows a normal distribution. A Naïve Bayes classification algorithm may include a multinomial model that is used for discrete counts. A Naïve Bayes classification algorithm may include a Bernoulli model that may be utilized when vectors are binary.

With continued reference to FIG. 1, apparatus 100 may be configured to generate an index classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating a k-nearest neighbors algorithm may include generating a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. As a non-limiting example, K-nearest neighbors algorithm may be configured to classify an input vector including a plurality of user-entered words and/or phrases, a plurality of attributes of a media item, such as spoken or written text, objects depicted in images, metadata, or the like, to clusters representing themes.

In an embodiment, and still referring to FIG. 1, apparatus 100, and/or a device generating an index classifier, may generate new similar semantic element functions using a feature learning algorithm. A "feature learning algorithm," as used herein, is a machine-learning algorithm that identifies associations between elements of data in a training data set, where particular outputs and/or inputs are not specified. For instance, and without limitation, a feature learning algorithm may detect co-occurrences of sets of semantic data, as defined above, with each other. As a non-limiting example, a feature learning algorithm may detect co-occurrences of similar semantic elements, as defined above, with each other. Apparatus 100 may perform a feature learning algorithm by dividing semantic data from a given source into various sub-combinations of such data to create similar semantic data sets as described above, and evaluate which similar semantic data sets tend to co-occur with which other similar semantic data sets. In an embodiment, a first feature learning algorithm may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of semantic elements with multiple similar semantic elements, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, apparatus 100 may generate a k-means clustering algorithm receiving unclassified semantic elements and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related semantic element data, which may be provided with similar semantic element data; this may, for instance, generate an initial set of similar semantic element data from an initial set of semantic element data of a large number of users, and may also, upon subsequent iterations, identify new clusters to be provided new similar semantic element data, to which additional semantic element data may be classified, or to which previously used semantic element data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $\text{argmin}_{ci \in C}$ dist(ci, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $$ci = 1/|Si| \sum xi \ni Si^{xi}.$$

K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected semantic element set. Degree of similarity index value may indicate how close a particular combination of semantic element data, similar semantic element data and/or semantic data of opportunities is to being classified by k-means algorithm to a particular cluster. K-means clustering algorithm may evaluate the distances of the combination of similar semantic element data to the k-number of clusters output by k-means clustering algorithm. Short distances between a set of semantic element data and a cluster may indicate a higher degree of similarity between the set of semantic element data and a particular cluster. Longer distances between a set of semantic element data and a cluster may indicate a lower degree of similarity between a semantic element data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a semantic element data set and the data entry cluster. Alternatively or additionally k-means clustering algorithm may select a plurality of clusters having low degree of similarity index values to semantic element data sets, indicative of greater degrees of similarity. Degree of similarity index values may be compared to a threshold number indicating a minimal degree of relatedness suitable for inclusion of a set of semantic element data in a cluster, where a degree of similarity indices falling under the threshold number may be included as indicative of high degrees of relatedness. Persons skilled in the art, upon reviewing the entirety of this disclosure, will be aware of various additional or alternative feature learning approaches that may be used consistently with this disclosure.

Still referring to FIG. 1, in some embodiments, apparatus 100 may be configured to generate and/or receive allocation improvement metric 108. An "allocation improvement metric" as used in this disclosure is a value or range of values corresponding to an increase in worth of one or more assets. Allocation improvement metric 108 may include, without limitation, quantities of currency, ratios of currency, stock market indicators, and the like. For instance and without limitation, allocation improvement metric 108 may include a percent increase of real estate value of a house of 12%. Apparatus 100 may automatically update allocation improvement metric 108 based on resource data of a present time, which may be acquired through one or more web queries, user input, and the like. As a non-limiting example, in 2008, allocation improvement metric 108 may have included a percent increase in stock holdings of 3%, whereas allocation improvement metric 108 may have included a percent increase in stock holdings of 8% in 2016.

Still referring to FIG. 1, in some embodiments, apparatus 100 may be configured to compare resource allocation data 104 with allocation improvement metric 108. Apparatus 100 may generate an optimization model. An "optimization model" as used in this disclosure is a process of maximizing or mining one or more values based on a set of constraints. In some embodiments, an optimization model may include an objective function. An "objective function" as used in this disclosure is a process of minimizing or maximizing one or more values based on a set of constraints. In some embodiments, an objective function of apparatus 100 may include an optimization criterion. An optimization criterion may include any description of a desired value or range of values for one or more attributes; desired value or range of values may include a maximal or minimal value, a range between maximal or minimal values, or an instruction to maximize or minimize an attribute. As a non-limiting example, an optimization criterion may specify that an attribute should be within a 1% difference of an attribute criterion. An optimization criterion may alternatively request that an attribute be greater than a certain value. An optimization criterion may specify one or more tolerances for precision in a matching of resource allocation data 104 to allocation improvement metrics 108. An optimization criterion may specify one or more desired attribute criteria for a matching process. In an embodiment, an optimization criterion may assign weights to different attributes or values associated with attributes. One or more weights may be expressions of value to a user of a particular outcome, attribute value, or other facet of a matching process. Optimization criteria may be combined in weighted or unweighted combinations into a function reflecting an overall outcome desired by a user; function may be an attribute function to be minimized and/or maximized. A function may be defined by reference to attribute criteria constraints and/or weighted aggregation thereof as provided by apparatus 100; for instance, an attribute function combining optimization criteria may seek to minimize or maximize a function of allocation improvement matching.

Still referring to FIG. 1, generation of an objective function may include generation of a function to score and weight factors to achieve a process score for each feasible pairing. In some embodiments, pairings may be scored in a matrix for optimization, where columns represent attributes and rows represent matches potentially paired therewith; each cell of such a matrix may represent a score of a pairing of the corresponding attribute to the corresponding match. In some embodiments, assigning a predicted process that optimizes the objective function includes performing a greedy algorithm process. A "greedy algorithm" is defined as an algorithm that selects locally optimal choices, which may or may not generate a globally optimal solution. For instance, apparatus 100 may select pairings so that scores associated therewith are the best score for each allocation improvement metric and/or for each resource datum. In such an example, optimization may determine the combination of attributes such that each attribute pairing includes the highest score possible.

Still referring to FIG. 1, an objective function may be formulated as a linear objective function. Apparatus 100 may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all resource data r, S is a set of all allocation improvement metrics s, $c_{rs}$ is a score of a pairing of a given resource datum with a given allocation improvement metric, and $x_{rs}$ is 1 if a resource datum r is paired with a match s, and 0 otherwise. Continuing the example, constraints may specify that each resource datum is assigned to only one allocation improvement metric, and each allocation improvement metric is assigned only one resource datum. Allocation improvement metrics may include allocation improvement metrics as described above. Sets of resource data may be optimized for a maximum score combination of all generated resource data. In various embodiments, apparatus 100 may determine a combination of resource data that maximizes a total score subject to a constraint that all resource data is paired to exactly one allocation improvement metric. Not all allocation improvement metrics may receive a resource datum pairing since each allocation improvement metric may only produce one resource data pairing. In some embodiments, an objective function may be formulated as a mixed integer optimization function. A "mixed integer optimization" as used in this disclosure is a program in which some or all of the variables are restricted to be integers. A mathematical solver may be implemented to solve for the set of feasible pairings that maximizes the sum of scores across all pairings; mathematical solver may be implemented on apparatus 100, another device, and/or may be implemented on third-party solver.

With continued reference to FIG. 1, optimizing an objective function may include minimizing a loss function, where a "loss function" is an expression an output of which an optimization algorithm minimizes to generate an optimal result. As a non-limiting example, apparatus 100 may assign variables relating to a set of parameters, which may correspond to score resource data as described above, calculate an output of mathematical expression using the variables, and select a pairing that produces an output having the lowest size, according to a given definition of "size," of the set of outputs representing each of plurality of candidate improvement thresholds; size may, for instance, included absolute value, numerical size, or the like. Selection of different loss functions may result in identification of different potential pairings as generating minimal outputs. Objectives represented in an objective function and/or loss function may include minimization of differences between resource data and allocation improvement metrics.

Still referring to FIG. 1, apparatus 100 may determine resource feedback 112. In some embodiments, apparatus 100 may determine resource feedback 112 as a function of a comparison of resource allocation data 104 to allocation improvement metric 108. For instance, and without limitation, apparatus 100 may compare one or more elements of resource allocation data 104, such as quantity of currency, with one or more elements of allocation improvement metric 108, such as a return of investment. Apparatus 100 may use any comparison, optimization, and/or other process, as described throughout this disclosure, without limitation, to generate resource feedback 112. "Resource feedback" as used in this disclosure is information relating to changes in value of one or more assets. Resource feedback 112 may include, without limitation, percent increase in value, percent decreases in value, projected value timelines, and the like. In some embodiments, apparatus 100 may provide resource feedback 112 through simulated input from a user. Simulated input may include entering resource allocation data 104 through one or more user interfaces of apparatus 100, such as GUI 128. Apparatus 100 may provide one or more "what-if" scenarios to a user through GUI 128, which may include varying resource feedbacks 112. A user may provide resource allocation data 104 through GUI 128, with one or more selected parameters of resource allocation data 104, such as, without limitation, rates, down payments, locations, and/or other property data. GUI 128 may display different simulated scenarios based on user input. Apparatus 100 may be configured to generate custom user logic for one or more simulated scenarios. "Custom user logic" as used in this disclosure is a set of one or more parameters defined by a user. Custom user logic may include one or more "if-then-else" rules. For instance and without limitation, custom user logic may include a rule stating if rent is less than $3,000 then lease an apartment for 12 months.

Still referring to FIG. 1, in some embodiments, resource feedback 112 may include one or more advisories and/or recommendations for a user. An "advisory" as used in this disclosure is a warning against a user performing an action. Advisories may include warnings of decreased value of one or more assets of a user. Decreased values of one or more assets may be determined through comparing resource allocation data 104 to allocation improvement metric 108. In some embodiments, resource feedback 112 may include one or more probability metrics. A "probability metric" as used in this disclosure is a value or range of values corresponding to likelihood of an event occurring. A probability metric of resource feedback 112 may correspond to one or more allocations of assets of an individual. For instance, and without limitation, a probability metric may include a 14% chance of gaining $5,000 through acquiring real estate. Probability metrics may be generated through any machine learning model as described thought this disclosure, without limitation. Apparatus 100 may utilize one or more probability metrics to generate allocation improvement metric 108. In some embodiments, resource feedback 112 may include a success parameter. A "success parameter" as used in this disclosure is one or more variables related to achieving a desired outcome. Success parameters may include, but are not limited to, dates, times, quantities of currency, third-party financial information, and the like.

Still referring to FIG. 1, apparatus 100 may be configured to generate resource allocation recommendation 124. A "resource allocation recommendation" as used in this disclosure is a proposal pertaining to one or more assets. Resource allocation recommendation 124 may include, without limitation, resource allocation proposals, advisories, and the like. In some embodiments, apparatus 100 may generate resource allocation recommendation 124 through resource allocation machine learning model 120. In some embodiments, apparatus 100 may determine resource allocation recommendation 124 as a function of resource feedback 112, allocation improvement metric 108, and/or resource allocation data 104.

Still referring to FIG. 1, in some embodiments apparatus 100 may utilize allocation improvement metric 108 to filter potential allocations of resources of a user. Potential allocations may include, but are not limited to, acquiring real estate, selling real estate, and the like. For instance and without limitation, allocation improvement metric 108 may filter potential resource allocations by a success parameter, such as a probability of making a profit from acquiring a property. Apparatus 100 may generate resource feedback 112 to include one or more ranked lists of potential acquisitions of one or more properties. In some embodiments, one or more ranked lists may be ranked by, but not limited to, success parameters, transaction times, geographical location, and the like. Apparatus 100 may display filtered potential resource allocations through GUI 128.

Still referring to FIG. 1, in some embodiments, apparatus 100 may generate resource training data 116. "Resource training data" as used in this disclosure is a set of resource allocation data correlated to success parameters. Resource training data 116 may be generated through previous iterations of processing, received through external computing devices, and/or received through user input, without limitation. In some embodiments, apparatus 100 may generate resource training data 116 as a function of a generation of resource feedback 112. In an embodiment, apparatus 100 may generate resource training data 116 in parallel with resource feedback 112 until a threshold limit is reached, such as a size of resource training data 116. Apparatus 100 may train resource allocation machine learning model 120 with resource training data 116. A "resource allocation machine learning model" as used in this disclosure is a machine learning process that outputs resource feedback. Resource allocation machine learning model 120 may include any machine learning model as described throughout this disclosure, without limitation. In some embodiments, resource allocation machine learning model 120 may receive training data, such as resource training data 116. Resource allocation machine learning model 120 may output resource feedback 112 as a function of resource allocation data 104, resource training data 116, and/or allocation improvement metric 108. In some embodiments, resource allocation machine learning model may be configured to output one or more potential resource allocation opportunities. Potential resource allocation opportunities may include, but are not limited to, acquiring real estate, renting out real estate, investing in real estate, selling real estate, and the like. Resource allocation machine learning model 120 may be configured to output one or more confidence scores along with resource feedback 112. A "confidence score" as used in this discourse is a metric pertaining to an accuracy of an output. Confidence scores may include, but are not limited to, values out of 1, values out of 100, percentages of 100, and the like. In some embodiments, apparatus 100 may be configured to receive user input, such as, without limitation, accepting and/or rejecting recommendations of resource feedback 112. Apparatus 100 may utilize user input to train resource allocation machine learning model 120. For instance, and without limitation, resource feedback 112 may include a recommendation of acquiring a $240,000 condominium with a 67% probability of making a profit. A user may reject this recommendation, to which resource allocation machine learning model 120 may incorporate into future recommendations.

Still referring to FIG. 1, in some embodiments, apparatus 100 may display resource allocation data 104, allocation improvement metric 108, and/or resource feedback 112 through graphical user interface (GUI) 124. A "graphical user interface" as used in this disclosure is an interface including a set of one or more pictorial and/or graphical icons corresponding to one or more computer actions. GUI 128 may be configured to receive user input, as described above. GUI 128 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input may include, a manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI 128.

Still referring to FIG. 1, in some embodiments, apparatus 100 may utilize a fuzzy logic system and/or fuzzy logic comparison to determine resource feedback 112. Apparatus 100 may compare one or more elements of resource allocation data 104 to one or more elements of allocation improvement metric 108. For instance and without limitation, apparatus 100 may compare a location of a property to a quantity of rooms to a property and, using fuzzy logic, determine an output of "good investment." Fuzzy logic may be as described below with reference to FIG. 5.

Still referring to FIG. 1, in some embodiments, apparatus 100 may utilize an immutable sequential listing to store, verify, and/or process data. Apparatus 100 may store resource allocation data 104, resource feedback 112, and/or other data in an immutable sequential listing. Apparatus 100 may generate a smart contract between two or more parties. A smart contract may be generated for a transaction of one or more real estate properties. Immutable sequential listings and smart contracts may be as described below with reference to FIG. 6.

Figure 2:
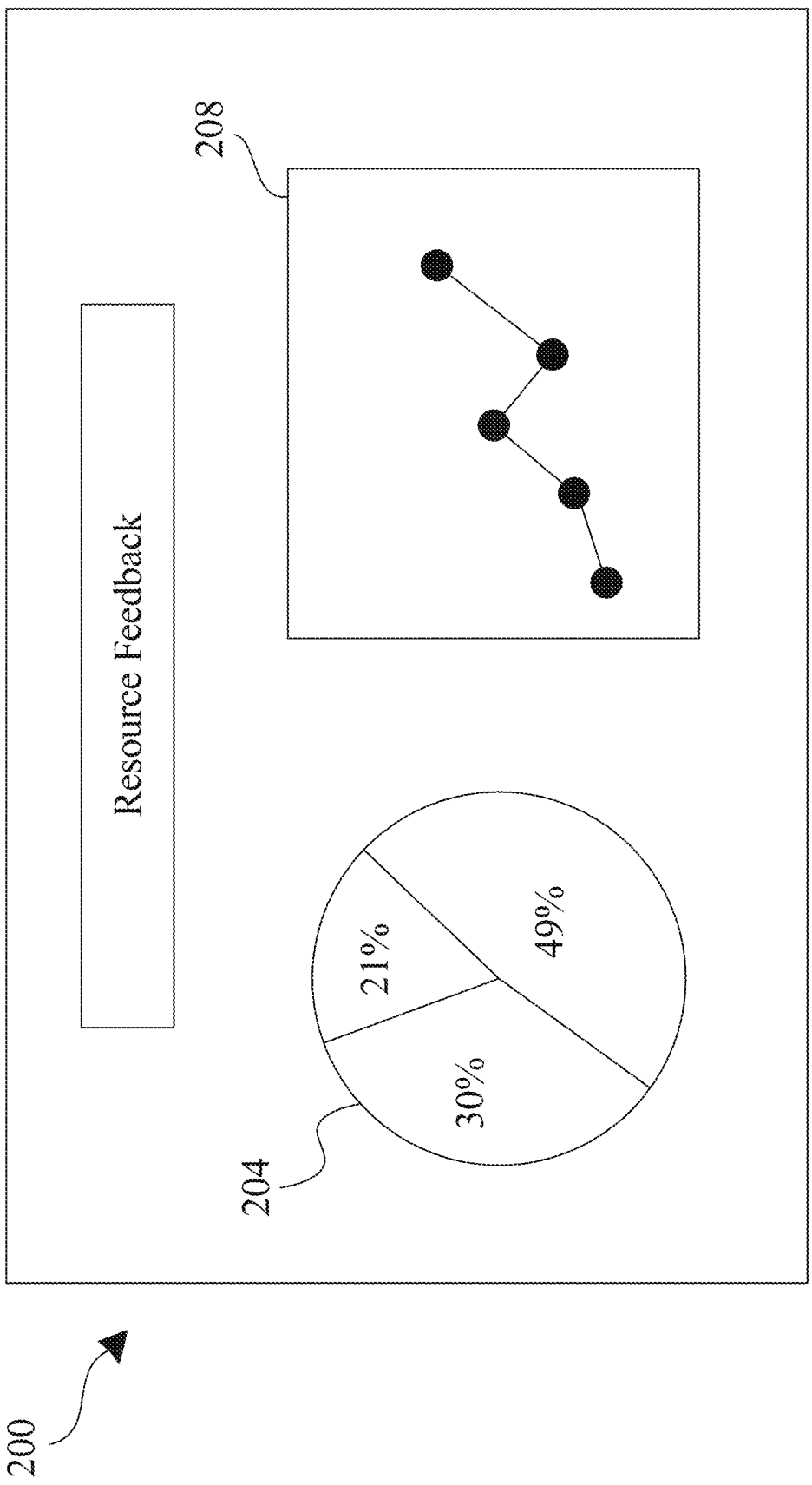
FIG. 2 illustrates an exemplary embodiment of a graphical user interface.

Referring now to FIG. 2, an exemplary embodiment of a graphical user interface (GUI) 200. GUI 200 may be displayed through one or more display devices, such as, but not limited to, smartphones, tablets, monitors, laptops, and the like. GUI 200 may include GUI 128 as described above with reference to FIG. 1. In some embodiments, GUI 200 may display resource feedback, such as resource feedback 112 as described above with reference to FIG. 1. GUI 200 may display one or more drop-down menus. A "drop-down" menu as used in this disclosure is a graphic icon having an event handler that extends the graphic icon upon user interaction. In some embodiments, GUI 200 may display a plurality of drop-down menus. Drop-down menus may display, but are not limited to displaying, in progress transactions, past transactions, potential transactions, and the like. For instance and without limitation, a drop-down menu may display a potential transaction of acquiring a $540,000 apartment building, and may extend a window, upon user interaction, to display details of the apartment building, predicted profit, and the like. In some embodiments, GUI 200 may display a stack of windows. A "stack of windows" as used in this discourse is a plurality of windows displayed staggered on top of one another. In some embodiments, GUI 200 may present a stack of windows, wherein each window may represent a recommended resource allocation. A user may click, swipe, or otherwise interact with a window of a stack of windows, which may represent an acceptance or rejection of a recommended resource allocation the window represents. For instance and without limitation, a user may swipe left on a window, which may represent a rejection of a proposed resource allocation of the window. Continuing this example, a user may swipe right on a window, which may represent an acceptance of a proposed resource allocation. GUI 200 may animate a window to "swipe" to a left, right, up, and/or down portion of a screen. In some embodiments, GUI 200 may display one or more data spreadsheets. Data spreadsheets may include one or more rows and/or columns populated with resource allocation data.

Still referring to FIG. 2, in some embodiments, GUI 200 may display a color coded arrangement of resource allocations. A "color code" as used in this disclosure is a system that conveys information through color. A color code may include, but is not limited to, red, blue, green, yellow, and/or any combination thereof. In some embodiments, a color code may include a red color for a resource allocation that may be losing value, a yellow color for a pending resource allocation, and/or a green color for a resource allocation that may be increasing in value. In some embodiments, a color code may include a gradient, such that there may be a gradual transition from one color to another, such as from yellow to green.

Still referring to FIG. 2, in some embodiments, GUI 200 may update resource feedback data and/or other data in real time. "Real time" as used in this disclosure is a present time. In some embodiments, GUI 200 may display probability chart 204. A "probability chart" as used in this disclosure is a graph representing likelihood of events occurring. Probability chart 204 may include, but is not limited to, pie chart, bar graphs, trend lines, and the like. In some embodiments, probability chart 204 may include a color code, such as a color code as described above. Probability chart 204 may display probabilities of making a profit from one or more resource allocations. In some embodiments, GUI 200 may display projected value timeline 208. A "projected value timeline" as used in this disclosure is a graph showing an estimated worth of one or more assets. Projected value timeline 208 may include one or more lines representing one or more assets. In some embodiments, projected value timeline 208 may include a color code, such as a color code as described above. In some embodiments, projected value timeline 208 may include multiple lines representing a same asset with different success parameters, such as, but not limited to, dates, times, property data, and the like.

Figure 3:
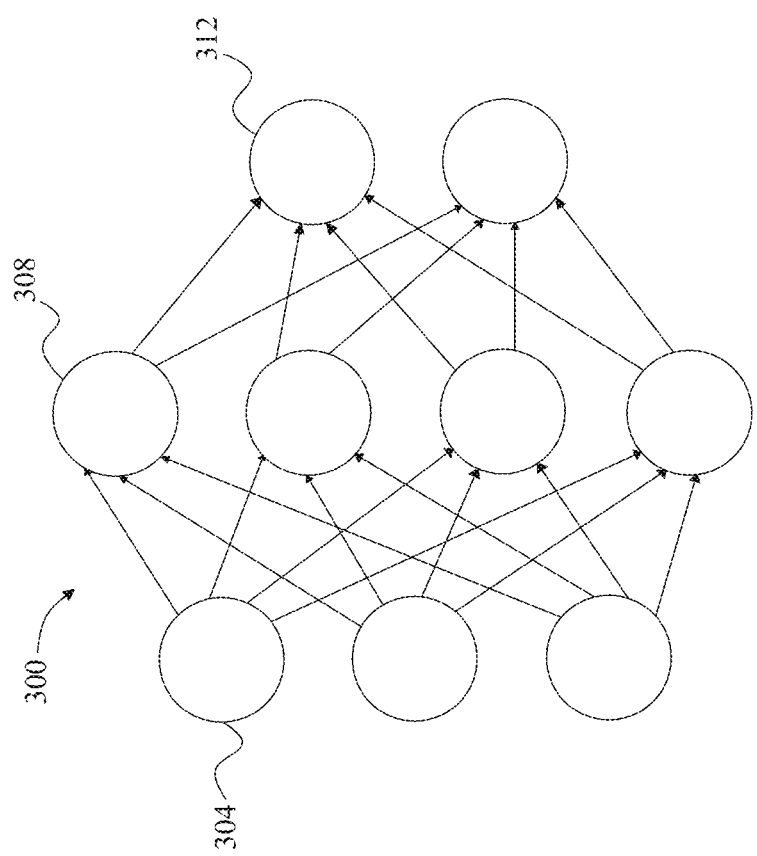
FIG. 3 is an exemplary embodiment of a neural net.

Referring now to FIG. 3, an exemplary embodiment of neural network 300 is illustrated. A neural network 300 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 304, one or more intermediate layers 308, and an output layer of nodes 312. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 4:
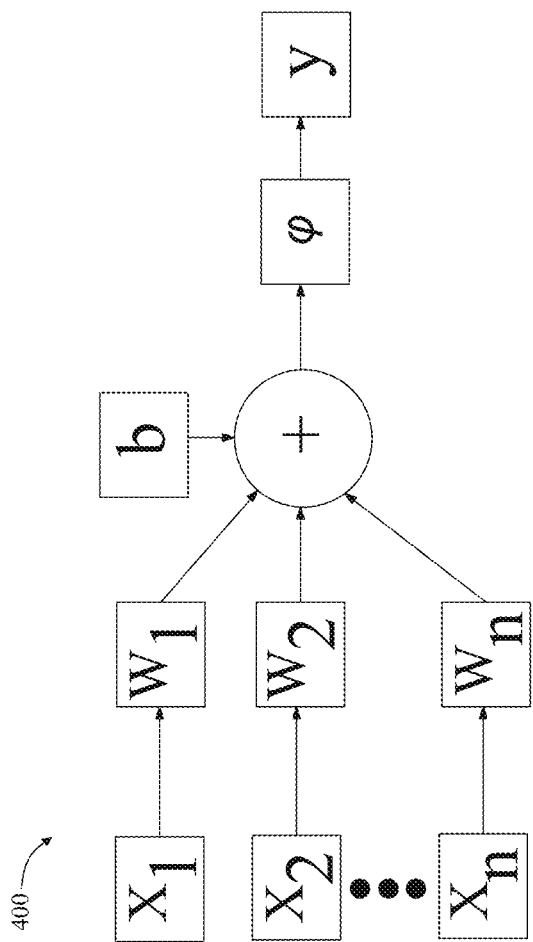
FIG. 4 is an exemplary embodiment of a neural node.

Referring now to FIG. 4, an exemplary embodiment of a node 400 of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 5:
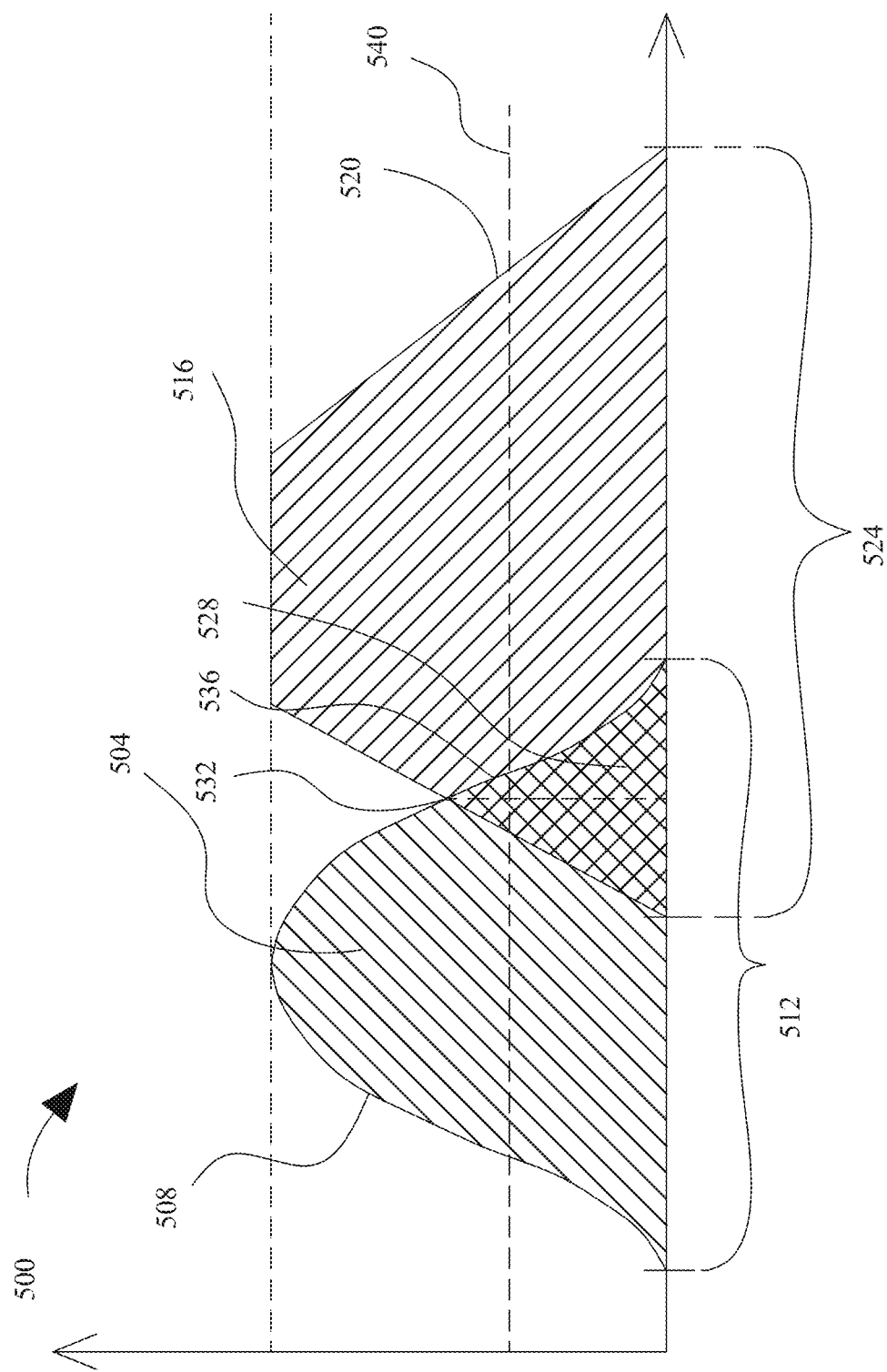
FIG. 5 is an exemplary embodiment of a fuzzy logic comparison.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0, 1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, resource allocation data, and a predetermined class, such as without limitation of allocation improvement metric. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or resource allocation data and a predetermined class, such as without limitation allocation improvement metric categorization, for combination to occur as described above. Alternatively or additionally, each threshold may be tuned by a machine-learning and/or statistical process, for instance and without limitation as described in further detail below.

Further referring to FIG. 5, in an embodiment, a degree of match between fuzzy sets may be used to classify resource allocation data with allocation improvement metrics. For instance, if an allocation improvement metric has a fuzzy set matching a resource allocation data fuzzy set by having a degree of overlap exceeding a threshold, apparatus 100 may classify the resource allocation data as belonging to the allocation improvement metric categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, resource allocation data may be compared to multiple allocation improvement metric categorization fuzzy sets. For instance, resource allocation data may be represented by a fuzzy set that is compared to each of the multiple allocation improvement metric categorization fuzzy sets; and a degree of overlap exceeding a threshold between the resource allocation data fuzzy set and any of the multiple allocation improvement metric categorization fuzzy sets may cause apparatus 100 to classify the resource allocation data as belonging to allocation improvement metric categorization. For instance, in one embodiment there may be two allocation improvement metric categorization fuzzy sets, representing respectively allocation improvement metric categorization and a success parameter. First allocation improvement metric categorization may have a first fuzzy set; Second allocation improvement metric categorization may have a second fuzzy set; and resource allocation data may have a resource allocation data fuzzy set. Apparatus 100, for example, may compare a resource allocation data fuzzy set with each of allocation improvement metric categorization fuzzy set and in an allocation improvement metric categorization fuzzy set, as described above, and classify a resource allocation data to either, both, or neither of allocation improvement metric categorization or in an allocation improvement metric categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, resource allocation data may be used indirectly to determine a fuzzy set, as resource allocation data fuzzy set may be derived from outputs of one or more machine-learning models that take the resource allocation data directly or indirectly as inputs.

Still referring to FIG. 5, a computing device may use a logic comparison program, such as, but not limited to, a fuzzy logic model to determine an allocation improvement metric response. An allocation improvement metric response may include, but is not limited to, loss, net zero, small profit, large profit, and the like; each such allocation improvement metric response may be represented as a value for a linguistic variable representing allocation improvement metric response or in other words a fuzzy set as described above that corresponds to a degree of success parameter met as calculated using any statistical, machine-learning, or other method that may occur to a person skilled in the art upon reviewing the entirety of this disclosure. In other words, a given element of resource allocation data may have a first non-zero value for membership in a first linguistic variable value such as "1" and a second non-zero value for membership in a second linguistic variable value such as "2." In some embodiments, determining a allocation improvement metric categorization may include using a linear regression model. A linear regression model may include a machine learning model. A linear regression model may be configured to map data of resource allocation data, such as degree of probability to one or more allocation improvement metric parameters. A linear regression model may be trained using a machine learning process. A linear regression model may map statistics such as, but not limited to, quality of resource allocation data, weight of resource allocation data, and the like. In some embodiments, determining an allocation improvement metric of resource allocation data may include using an allocation improvement metric classification model. An allocation improvement metric classification model may be configured to input collected data and cluster data to a centroid based on, but not limited to, frequency of appearance, linguistic indicators of quality, and the like. Centroids may include scores assigned to them such that quality of . . . of resource allocation data may each be assigned a score. In some embodiments allocation improvement metric classification model may include a K-means clustering model. In some embodiments, allocation improvement metric classification model may include a particle swarm optimization model. In some embodiments, determining the allocation improvement metric of resource allocation data may include using a fuzzy inference engine. A fuzzy inference engine may be configured to map one or more resource allocation data elements using fuzzy logic. In some embodiments, resource allocation data may be arranged by a logic comparison program into allocation improvement metric arrangement. An "allocation improvement metric arrangement" as used in this disclosure is any grouping of objects and/or data based on skill level and/or output score. This step may be implemented as described above in FIGS. 1-4. Membership function coefficients and/or constants as described above may be tuned according to classification and/or clustering algorithms. For instance, and without limitation, a clustering algorithm may determine a Gaussian or other distribution of resource allocation data about a centroid corresponding to a given importance level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented according to input and/or output membership functions and/or linguistic variables. For instance, a first linguistic variable may represent a first measurable value pertaining to resource allocation data, such as a degree of importance of an element, while a second membership function may indicate a degree of in an allocation improvement metric of a subject thereof, or another measurable value pertaining to resource allocation data. Continuing the example, an output linguistic variable may represent, without limitation, a score value. An inference engine may combine rules, such as: "if the probability of profit is 'low' and the cost is 'high', the recommended resource allocation is 'poor"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity ($T(a, b)=T(b, a)$), monotonicity: ($T(a, b) \leq T(c, d)$ if $a \leq c$ and $b \leq d$), (associativity: $T(a, T(b, c))=T(T(a, b), c)$), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: $\perp(a, b) = \perp(b, a)$, monotonicity: $\perp(a, b) \leq \perp(c, d)$ if $a \leq c$ and $b \leq d$, associativity: $\perp(a, \perp(b, c)) = \perp(\perp(a, b), c)$, and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 5, resource allocation data to be used may be selected by user selection, and/or by selection of a distribution of output scores, such as 50% profit, 40% high profit, and 10% loss or the like. Each allocation improvement metric categorization may be selected using an additional function such as in allocation improvement metric as described above.

Figure 6:
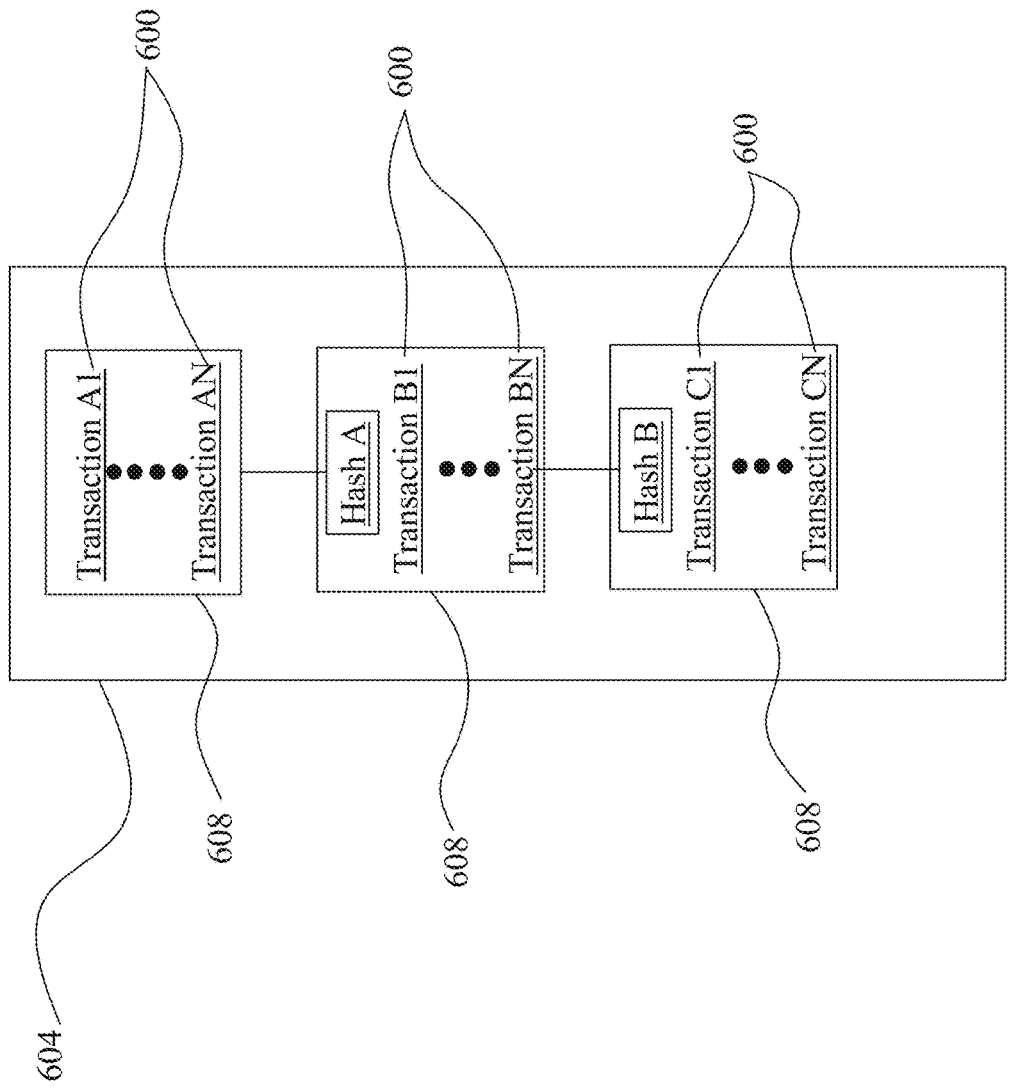
FIG. 6 is an exemplary embodiment of an immutable sequential listing.

Referring now to FIG. 6, an exemplary embodiment of an immutable sequential listing 600 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Data elements are listing in immutable sequential listing 600; data elements may include any form of data, including textual data, image data, encrypted data, cryptographically hashed data, and the like. Data elements may include, without limitation, one or more at least a digitally signed assertions. In one embodiment, a digitally signed assertion 604 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 604. In an embodiment, collection of textual data states that the owner of a certain transferable item represented in a digitally signed assertion 604 register is transferring that item to the owner of an address. A digitally signed assertion 604 may be signed by a digital signature created using the private key associated with the owner's public key, as described above.

Still referring to FIG. 6, a digitally signed assertion 604 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 604 may describe the transfer of a physical good; for instance, a digitally signed assertion 604 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 604 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 6, in one embodiment, an address is a textual datum identifying the recipient of virtual currency or another item of value in a digitally signed assertion 604. In some embodiments, address is linked to a public key, the corresponding private key of which is owned by the recipient of a digitally signed assertion 604. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 604 may record a subsequent a digitally signed assertion 604 transferring some or all of the value transferred in the first a digitally signed assertion 604 to a new address in the same manner. A digitally signed assertion 604 may contain textual information that is not a transfer of some item of value in addition to, or as an alternative to, such a transfer. For instance, as described in further detail below, a digitally signed assertion 604 may indicate a confidence level associated with a distributed storage node as described in further detail below.

In an embodiment, and still referring to FIG. 6 immutable sequential listing 600 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 600 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 6, immutable sequential listing 600 may preserve the order in which the at least a posted content took place by listing them in chronological order; alternatively or additionally, immutable sequential listing 600 may organize digitally signed assertions 604 into sub-listings 608 such as "blocks" in a blockchain, which may be themselves collected in a temporally sequential order; digitally signed assertions 604 within a sub-listing 608 may or may not be temporally sequential. The ledger may preserve the order in which at least a posted content took place by listing them in sub-listings 608 and placing the sub-listings 608 in chronological order. The immutable sequential listing 600 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 600 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 6, immutable sequential listing 600, once formed, may be inalterable by any party, no matter what access rights that party possesses. For instance, immutable sequential listing 600 may include a hash chain, in which data is added during a successive hashing process to ensure non-repudiation. Immutable sequential listing 600 may include a block chain. In one embodiment, a block chain is immutable sequential listing 600 that records one or more new at least a posted content in a data item known as a sub-listing 608 or "block." An example of a block chain is the BITCOIN block chain used to record BITCOIN transactions and values. Sub-listings 608 may be created in a way that places the sub-listings 608 in chronological order and link each sub-listing 608 to a previous sub-listing 608 in the chronological order so that any computing device may traverse the sub-listings 608 in reverse chronological order to verify any at least a posted content listed in the block chain. Each new sub-listing 608 may be required to contain a cryptographic hash describing the previous sub-listing 608. In some embodiments, the block chain contains a single first sub-listing 608 sometimes known as a "genesis block."

Still referring to FIG. 6, the creation of a new sub-listing 608 may be computationally expensive; for instance, the creation of a new sub-listing 608 may be designed by a "proof of work" protocol accepted by all participants in forming the immutable sequential listing 600 to take a powerful set of computing devices a certain period of time to produce. Where one sub-listing 608 takes less time for a given set of computing devices to produce the sub-listing 608 protocol may adjust the algorithm to produce the next sub-listing 608 so that it will require more steps; where one sub-listing 608 takes more time for a given set of computing devices to produce the sub-listing 608 protocol may adjust the algorithm to produce the next sub-listing 608 so that it will require fewer steps. As an example, protocol may require a new sub-listing 608 to contain a cryptographic hash describing its contents; the cryptographic hash may be required to satisfy a mathematical condition, achieved by having the sub-listing 608 contain a number, called a nonce, whose value is determined after the fact by the discovery of the hash that satisfies the mathematical condition. Continuing the example, the protocol may be able to adjust the mathematical condition so that the discovery of the hash describing a sub-listing 608 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 608 according to the protocol is known as "mining." The creation of a new sub-listing 608 may be designed by a "proof of stake" protocol as will be apparent to those skilled in the art upon reviewing the entirety of this disclosure.

Continuing to refer to FIG. 6, in some embodiments, protocol also creates an incentive to mine new sub-listings 608. The incentive may be financial; for instance, successfully mining a new sub-listing 608 may result in the person or entity that mines the sub-listing 608 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 608 Each sub-listing 608 created in immutable sequential listing 600 may contain a record or at least a posted content describing one or more addresses that receive an incentive, such as virtual currency, as the result of successfully mining the sub-listing 608.

With continued reference to FIG. 6, where two entities simultaneously create new sub-listings 608, immutable sequential listing 600 may develop a fork; protocol may determine which of the two alternate branches in the fork is the valid new portion of the immutable sequential listing 600 by evaluating, after a certain amount of time has passed, which branch is longer. "Length" may be measured according to the number of sub-listings 608 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 608 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 600 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 600.

Still referring to FIG. 6, additional data linked to at least a posted content may be incorporated in sub-listings 608 in the immutable sequential listing 600; for instance, data may be incorporated in one or more fields recognized by block chain protocols that permit a person or computer forming a at least a posted content to insert additional data in the immutable sequential listing 600. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 6, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 608 in a block chain computationally challenging; the incentive for producing sub-listings 608 may include the grant of new crypto-currency to the miners. Quantities of crypto-currency may be exchanged using at least a posted content as described above.

Figure 7:
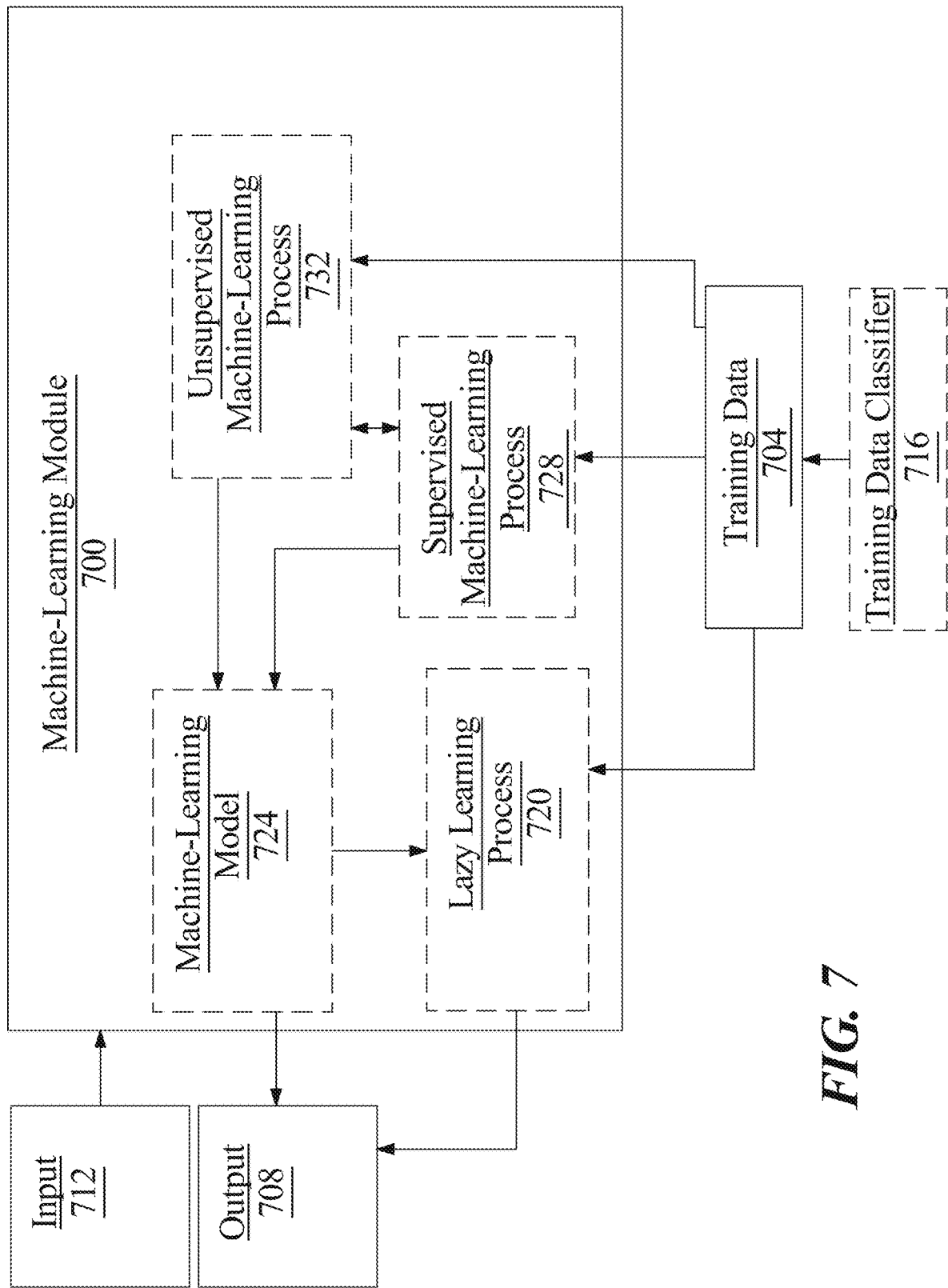
FIG. 7 is a block diagram of an exemplary embodiment of a machine learning model.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example inputs may include resource allocation data and outputs may include resource feedback.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to real estate data, locational data, high success parameters, low success parameters, and the like.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include resource allocation data as described above as inputs, resource feedback as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 8:
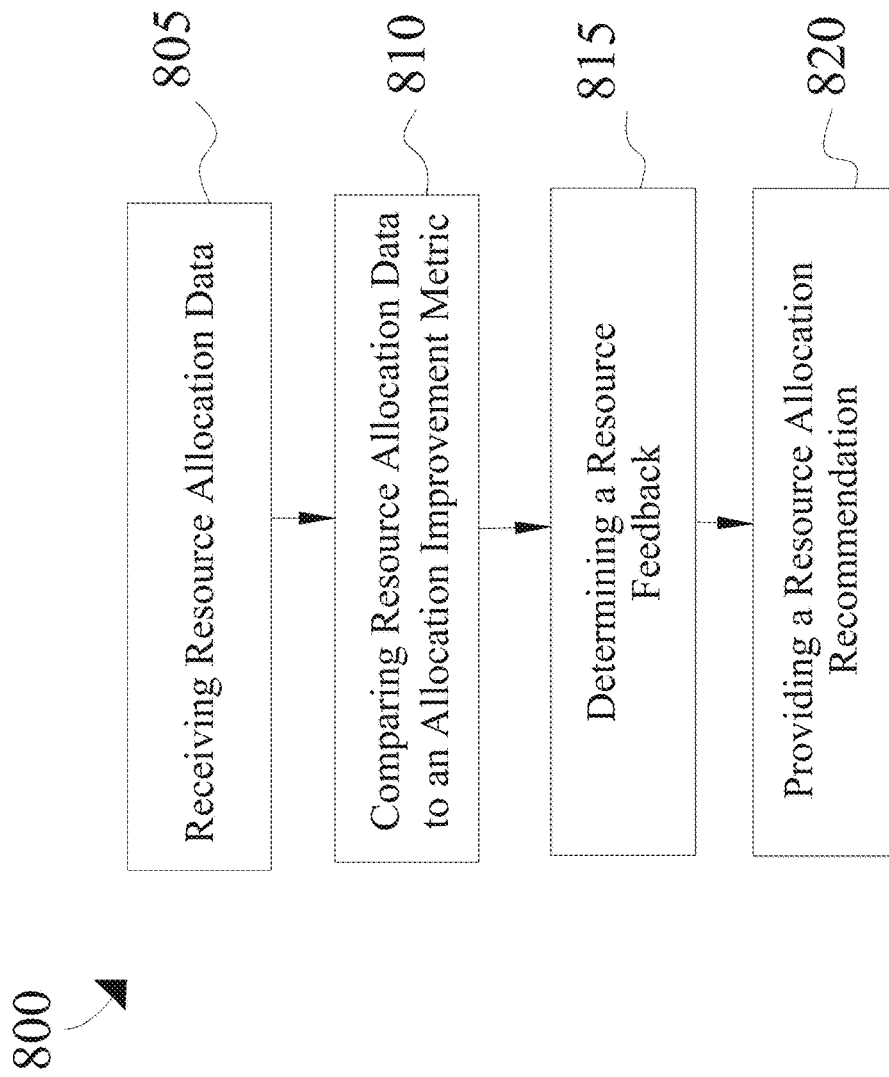
FIG. 8 is a flowchart of an exemplary embodiment of a method of generating resource allocation recommendations.

Referring now to FIG. 8, a method 800 of providing resource feedback is presented. At step 805, method 800 includes receiving, via at least a processor, resource allocation data. Resource allocation data may be extracted from a resource document utilizing a language processing module. This step may be implemented as described above in FIGS. 1-7 without limitation.

Still referring to FIG. 8, at step 810, method 800 includes comparing resource allocation data to an allocation improvement metric. Comparing resource allocation data to an allocation improvement metric may include utilizing an optimization model. This step may be implemented as described above in FIGS. 1-7 without limitation.

Still referring to FIG. 8, at step 815, method 800 includes determining a resource feedback. Resource feedback may be determined through a resource feedback machine learning model. This step may be implemented as described above in FIGS. 1-7 without limitation.

Still referring to FIG. 8, at step 820, method 800 includes providing a resource allocation recommendation to a user as a function of resource feedback. Providing a resource allocation recommendation may include providing a ranked list of resource allocation recommendations. This step may be implemented as described above in FIGS. 1-7 without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
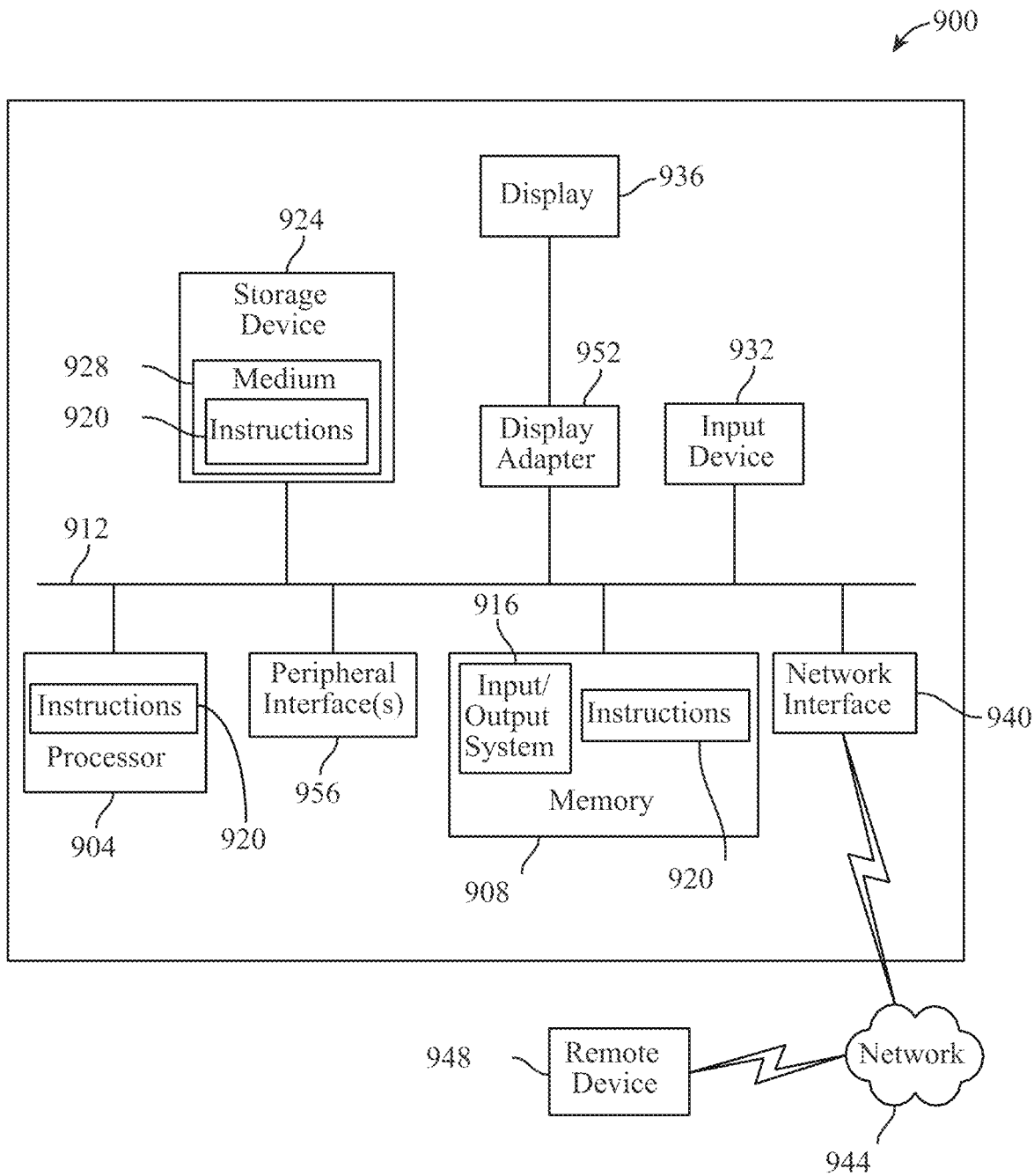
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956.

Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating resource feedback, comprising:
    at least a processor;
    a memory communicatively connected to the at least a processor, wherein the memory contains instructions configuring the at least a processor to:
        receive resource allocation data comprising property data, wherein the property data includes information on one or more real estate properties associated with a user;
        compare the resource allocation data to an allocation improvement metric, wherein comparing the resource allocation data to the allocation improvement metric comprises determining information on a change in value of at least one real estate property of the one or more real estate properties associated with the user;
        determine, as a function of the comparison, a resource feedback, wherein
            determining the resource feedback comprises:
                generating training data correlating a plurality of resource allocation data, allocation improvement metric data and resource feedback data by at least using input-output results of previous iterations of implementing a resource allocation machine learning model;
                training the resource allocation machine learning model with the training data; and
                determining the resource feedback as a function of the received resource allocation data and the allocation improvement metric using the trained resource allocation machine learning model, wherein the resource feedback comprises one or more potential resource allocation opportunities linked with at least the at least one real estate property;
        provide a resource allocation recommendation to a user as a function of the resource feedback, wherein the resource allocation recommendation comprises a recommendation based on the one or more potential resource allocation opportunities linked with at least the at least one real estate property, wherein the resource allocation recommendation comprises a proposal, pertaining to a transaction involving the at least one real estate property, with a transaction price and a probability of making a profit on the transaction;
        receive a user input from the user accepting or rejecting the resource allocation recommendation based on the transaction price and the probability of making the profit on the transaction; and
        update the training data with information associated with the user input.

2. The apparatus of claim 1, wherein the memory contains instructions configuring the at least a processor to extract the resource allocation data from a resource document using a language processing module.

3. The apparatus of claim 1, wherein the memory contains instructions configuring the at least a processor to generate a confidence score of the resource allocation recommendation.

4. The apparatus of claim 1, wherein the memory contains instructions configuring the at least a processor to compare the resource allocation data to an allocation improvement metric using an optimization model.

5. The apparatus of claim 1, wherein the memory contains instructions configuring the at least a processor to generate a ranked list of resource allocation recommendations.

6. The apparatus of claim 5, wherein the memory contains instructions configuring the at least a processor to provide the ranked list to a user through a graphical user interface (GUI).

7. The apparatus of claim 1, wherein the memory contains instructions configuring the at least a processor to generate a query for resource data.

8. The apparatus of claim 1, wherein the memory contains instructions configuring the at least a processor to display a stack of windows through a graphical user interface.

9. The apparatus of claim 8, wherein the stack of windows includes a color code.

10. The apparatus of claim 1, wherein the resource allocation machine learning model comprises an artificial neural network including an input layer of nodes, at least an intermediate layer of nodes and an output layer of nodes, wherein the artificial neural network is trained by:
    creating connections between the nodes by applying elements from the training data to at least the input layer of nodes; and
    adjusting, using a training algorithm, the connections and weights between nodes in adjacent layers of the artificial neural network to produce output values at the output layer nodes.

11. The apparatus of claim 1, wherein the resource allocation machine learning model comprises an artificial neural network including an input layer of nodes, at least an intermediate layer of nodes and an output layer of nodes, wherein the artificial neural network is trained by:
    creating connections between the nodes by applying elements from the training data to at least the input layer of nodes; and
    adjusting, using a training algorithm, the connections and weights between nodes in adjacent layers of the artificial neural network to produce output values at the output layer nodes.

12. A method of providing resource allocation recommendations, comprising:
- receiving, by at least a processor, resource allocation data comprising property data, wherein the property data includes information on one or more real estate properties associated with a user;
- comparing, at the at least a processor, the resource allocation data to an allocation improvement metric, wherein comparing the resource allocation data to the allocation improvement metric comprises determining information on a change in value of at least one real estate property of the one or more real estate properties associated with the user;
- determining, at the at least a processor, as a function of the comparison, a resource feedback, wherein determining the resource feedback comprises:
  - generating training data correlating a plurality of resource allocation data, allocation improvement metric data and resource feedback data by at least using input-output results of previous iterations of implementing a resource allocation machine learning model;
  - training the resource allocation machine learning model with the training data; and
  - determining the resource feedback as a function of the received resource allocation data and the allocation improvement metric using the trained resource allocation machine learning model, wherein the resource feedback comprises one or more potential resource allocation opportunities linked with at least the at least one real estate property;
- providing, at the at least a processor, a resource allocation recommendation to a user as a function of the resource feedback, wherein the resource allocation recommendation comprises a recommendation based on the one or more potential resource allocation opportunities linked with at least the at least one real estate property, wherein the resource allocation recommendation comprises a proposal, pertaining to a transaction involving the at least one real estate property, with a transaction price and a probability of making a profit on the transaction;
- receiving, at the at least a processor, a user input from the user accepting or rejecting the resource allocation recommendation based on the transaction price and the probability of making the profit on the transaction; and
- updating, at the at least a processor, the training data with information associated with the user input.

13. The method of claim 12, further comprising extracting, via the at least a processor, the resource allocation data from a resource document utilizing a language processing module.

14. The method of claim 12, further comprising generating, at the at least a processor, a confidence score of the resource allocation recommendation.

15. The method of claim 12, wherein comparing further comprises comparing the resource allocation data to an allocation improvement metric using an optimization model.

16. The method of claim 12, further comprising generating, at the at least a processor, a ranked list of resource allocation recommendations.

17. The method of claim 16, further comprising providing, via the at least a processor, the ranked list to a user through a graphical user interface (GUI).

18. The method of claim 12, further comprising generating, via the at least a processor, a query for resource data.

19. The method of claim 12, further comprising displaying, through a graphical user interface, a stack of windows.

20. The method of claim 19, wherein the stack of windows includes a color code.

* * * * *